United States Patent [19]

Gaillard

[11] 4,006,881
[45] Feb. 8, 1977

[54] FLUID-TIGHT PACKING FOR CLOSURE DEVICES AND DEVICES FITTED WITH SAID PACKING

[75] Inventor: Georges Gaillard, Montmorency, France

[73] Assignee: Gachot S.A., Soisy-sous-Montmorency, France

[22] Filed: Dec. 9, 1974

[21] Appl. No.: 530,556

[52] U.S. Cl. .............................. 251/214; 251/315; 277/DIG. 6; 251/368; 277/124; 251/148; 251/171
[51] Int. Cl.² .......................................... F16K 41/00
[58] Field of Search ...................... 251/315–317, 251/214, 171, 362, 368, 148, 150–152; 277/105, 125, 124, 122, 121, 118, DIG. 6; 285/331; 423/447.2

[56] References Cited

UNITED STATES PATENTS

| 911,808 | 2/1909 | Condon | 277/124 |
|---|---|---|---|
| 1,389,625 | 9/1921 | Churchward | 251/368 |
| 2,274,439 | 2/1942 | Tinker | 285/331 |
| 2,689,145 | 9/1954 | Magos et al. | 277/105 |
| 2,886,352 | 5/1959 | Krellner | 277/DIG. 6 |
| 3,061,269 | 10/1962 | Sinkler | 251/317 |
| 3,108,018 | 10/1963 | Lewis | 277/DIG. 6 |
| 3,188,048 | 6/1965 | Sutherland | 251/368 |
| 3,428,292 | 2/1969 | Scaramucci | 251/315 |
| 3,462,120 | 8/1969 | Priese | 251/315 |
| 3,675,893 | 7/1972 | Avelines | 251/315 |
| 3,859,158 | 1/1975 | Park | 423/447.2 |

FOREIGN PATENTS OR APPLICATIONS

| 122,368 | 9/1944 | Australia | 251/315 |
|---|---|---|---|
| 1,327,181 | 3/1962 | France | 251/305 |
| 250,272 | 8/1947 | Switzerland | 277/124 |

Primary Examiner—William R. Cline
Assistant Examiner—H. Jay Spiegel
Attorney, Agent, or Firm—Young & Thompson

[57] ABSTRACT

At least part of a packing which is compressed between two components of a closure device such as a cock or valve is cut from a sheet of carbonaceous material formed by the association of carbon fibers with expanded graphite and compacted at least to a partial extent by compression in a direction which is transverse to the plane of the sheet.

4 Claims, 3 Drawing Figures

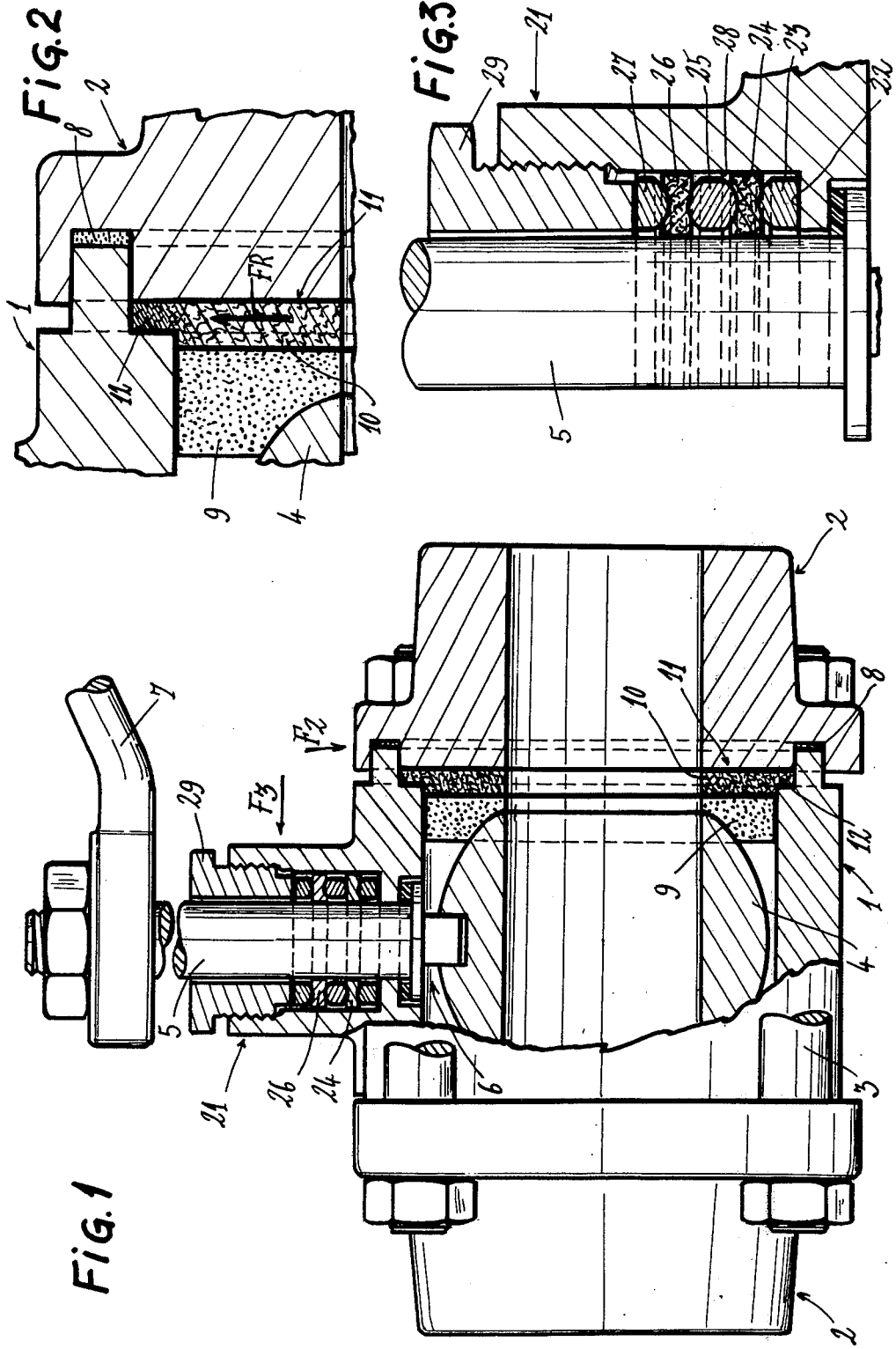

FLUID-TIGHT PACKING FOR CLOSURE DEVICES AND DEVICES FITTED WITH SAID PACKING

This invention relates to a fluid-tight packing which provides an effective seal at high temperatures and is more especially intended to be fitted in closure devices such as cocks and valves for controlling the circulation of a fluid in a pipe or duct.

It is known that a threefold problem arises in devices of this type in regard to leak-tightness:

between the body of the device and the pipe or duct in which it is fitted;

between the two internal spaces formed within the pipe and separated from each other by the closure device;

at the point of emergence of the operating rod from the valve body.

Many solutions to this problem have been found in the case in which the fluid to be controlled is at a moderate temperature by making use of seals and packings of plastic material (especially polytetrafluoroethylene) associated in some cases with metal supports.

At high temperatures of the order of 600° C to 700° C, the conventional materials which are used in the fabrication of fluid-tight packings are liable to sustain more or less extensive damage. This is the case, for example, with polytetrafluoroethylene and various composite materials of known types. For a long time, such conditions of operation had seldom been encountered in the industrial field and usually applied only to units of fairly large size such as high-pressure steam block valves in thermal power plants which justified the adoption of relatively costly solutions such as metallic seals which entail the need for special machining of the bearing surfaces.

Since these conditions of operation are now more frequently met with and apply to valves of all sizes, it has become important to find a simple solution to the problem of fluid-tightness at high temperatures.

One important aspect of the problem is that of the hydrocarbons or other inflammable substances which normally circulate at moderate temperatures. When the closure device is heated to a high temperature for some accidental reason such as fire, for example, it is at this precise moment that the highest possible degree of fluid-tightness is required. As a rule, however, a temperature rise results in destruction of the seals and in loss of leak-tightness of the closure device.

One known solution consists in adopting graphite seals since this material has high heat resistance. It has low resilience, however, and does not readily lend itself to simultaneous clamping of a number of seals between two identical components or to its use as a stuffing-box packing. Furthermore, in the particular case of spherical plug valves, efficient clamping of graphite valve-seats against the spherical plug entails the need for high pressure which is often incompatible with great ease of operation.

A known carbonaceous material constituted by the association of carbon fibers with expanded graphite also affords good heat resistance as well as suitable resilience. Since it is fabricated in the form of sheets, the material has good fluid-tightness in the direction which is transverse to the sheet and can accordingly be employed as a seal under these conditions. On the other hand, the fibrous and laminated structure of this material gives it poor fluid-tightness in the direction parallel to the sheet, that is to say in the usual direction of leakages when the seal is mounted on a closure device such as a cock or a valve.

The aim of the present invention is to construct a fluid-tight packing which retains its effectiveness at temperatures of the order of 600° C to 700° C, which is simple to construct, easy to use and provides a solution to the triple problem of fluid-tightness in closure devices as mentioned in the foregoing.

In accordance with the invention, the fluid-tight packing for closure devices which is compressed between two components of a device of this type is characterized in that at least part of said packing is cut from a sheet of carbonaceous material constituted by the association of carbon fibers with expanded graphite and compacted at least to a partial extent by compression transversely to the plane of the sheet.

There is thus obtained a heat-resistant packing which provides substantially isotropic fluid-tightness since an unexpected result of the compacting operation is the fact that it achieves a high standard of longitudinal tightness in the regions in which this proves necessary. The value of compression of the packing at the time of compacting is preferably of the order of 10 bars.

In accordance with a particular embodiment of the invention, consideration is given to an application in which the compacted portion of the packing is inserted between the body of a spherical plug valve and the pipe-connection flanges whilst a non-compacted portion is inserted between the valve-seat and the member which applies the valve-seat against the spherical plug.

Thus, whereas the compacted portion performs the function of a seal, the non-compacted portion is employed as a spring for applying the valve-seat against the spherical plug: this arrangement achieves a high degree of fluid-tightness between the valve-seat and the spherical plug as well as great ease of operation.

In a second particular embodiment of the invention which is also contemplated by way of application, a portion of the packing which has not previously been compacted constitutes a washer which is mounted as a stuffing-box packing, said washer being clamped by means of a gland of the stuffing-box between two metallic washers each having a convex bearing surface.

In this function, fluid-tightness must be applied primarily in the transverse direction with respect to the washer and is accordingly achieved by virtue of the known properties of the material. But if fluid-tightness is not ensured in the direction parallel to the plane of the washer, considerable leakage is liable to develop. In point of fact, clamping between convex bearing surfaces results in longitudinal fluid-tightness of the material.

Further properties of the invention will become apparent from the following detailed description, reference being made to the accompanying drawing which is given by way of example without any limitation being implied, and wherein:

FIG. 1 is a cutaway view in elevation showing a spherical plug valve fitted with a fluid-tight packing in accordance with the invention;

FIG. 2 is an enlarged view of that portion of FIG. 1 which is designated by the arrow F2;

FIG. 3 is an enlarged view of that portion of FIG. 1 which is designated by the arrow F3.

Referring to FIG. 1, the spherical plug valve comprises a body 1 clamped between two connecting-flanges 2 by means of tie-bolts such as 3. A bored spherical plug 4 is rigidly fixed to an operating stem 5 by means of a coupling member 6 of the screwdriver blade type. An operating lever 7 is fixed on the stem 5.

Referring now to FIG. 2, each connecting-flange 2 applies a graphite seal 8 against the valve body 1 and applies a graphite valve-seat 9 against the spherical plug 4 by means of the central portion 10 of a washer 11. The valve-seat 9 of hard graphite is hollowed-out to conform to the profile of the spherical plug 4. The washer 11 is made of commercially available resilient carbonaceous material obtained from expanded graphite and carbon fibers; by way of example, the material produced under the trade name Papyex by the company known as Le Carbone Lorraine is suitable for this purpose.

A material of this type has a structure which is substantially laminated in a direction parallel to the plane of the sheet from which the washer 11 is cut-out. The peripheral portion 12 of the washer 11 has preferably been subjected to compacting by compression under a pressure of approximately 10 bars, which has permitted a permanent reduction in thickness of said portion by approximately 20%. Said portion 12 is clamped between the valve body 1 and the flange 2. Machining of the opposite bearing faces of the valve body 1 and the flange 2 is such that the portion 12 of the washer 11 is compressed between the two components aforementioned, preferential clamping action being nevertheless exerted on the washer 8. If the portion 12 of the washer 11 has not been subjected to compacting, an equivalent deformation is obtained by compression at the time of assembly, this being achieved by means of the tie-bolts 3.

Referring to FIG. 3, a stuffing-box 21 forms a single piece with the valve body 1 and has an annular shoulder 22 on which are stacked from the bottom upwards the following sealing components:

a metallic washer 23 having a convex top bearing surface, a washer 24 of the same material as the washer 11 aforementioned, a metallic washer 25 having two convex bearing surfaces, a washer 26 which is identical with the washer 24, a metallic washer 27 having a convex bottom bearing surface.

The dimensions of the washers 24 and 26 are such that, when they are fitted in position, they are capable of sliding freely without any appreciable play within the annular space left between the stem 5 and the bore 28 of the stuffing-box 21.

At the time of assembly, the stack formed by the washers 23 to 27 is compressed under a pressure of approximately 10 bars by means of a gland nut 29 which is screwed into the stuffing-box 21, thus resulting in flattening of the central portion of the washers 24 and 26 by approximately 20%.

During operation, since fluid-tightness at the joint between the valve body 1 and the connecting-flanges 2 is provided by the seal 8, it is found unexpectedly that excellent tightness of closure is achieved at the same time as great ease of operation by means of the lever 7. This surprising result can be explained by considering that, by virtue of its resilient properties, the central portion 10 of the washer 11 performs the function of a spring having a high degree of stiffness which forcibly applies the valve-seat 9 against the spherical plug 4, thus achieving a high standard of leak-tightness between these two components; however, this forcible application is not rigid and the spherical plug can still be readily operated.

It is an admitted fact that the laminated structure of the washer 11 results in a certain degree of permeability of this latter in the radial direction and could be expected to permit the fluid to pass around the valve-seat 9. In order to explain the leak-tightness which is obtained, it can be considered that the fluid which may impregnate the central portion 10 of said washer 11 and which has a tendency under the action of the pressure within the pipe to progress radially in the direction of the arrow FR cannot reach the portion 12 in which the laminated structure has been flattened as a result of compacting by compression, thereby making said portion 12 also fluid-tight in the radial direction. The fluid is thus imprisoned and prevented from passing around the valve-seat 9.

The stuffing-box unit also has outstanding fluid-tightness during operation and this can be attributed to the particular mode of clamping of the washers 24 and 26. In fact, these washers are endowed in known manner with good fluid-tightness in the transverse direction and the central portion of these latter is flattened as a result of compression by the convex washers 23, 25 and 27 so that on the one hand they are endowed with fluid-tightness in the radial direction by flattening of their laminated structure and that on the other hand they are deformed by forcibly applying their edges against the operating stem 5 and against the bore 28.

The fluid-tight packing in accordance with the present invention therefore makes it possible to achieve a high standard of leak-tightness as well as great ease of operation while also making it possible to retain its properties at high temperatures.

It is apparent that the present invention is not limited to the embodiment hereinabove described, that many types of closure devices can accordingly be fitted with fluid-tight packing units of this type, and that various alternative forms of construction could also be contemplated.

I claim:

1. A closure device such as a valve or cock which is primarily intended to withstand high temperatures, comprising a plug actuated by a rod moving across a stuffing-box packing, wherein said packing comprises at least one washer of carbonaceous sheet material formed by the association of carbon fibers with expanded graphite, said washer being cut out from a sheet and having a structure which is substantially laminated in a direction parallel to the plane of the sheet from which the washer is cut out, said washer being clamped by a gland nut of said stuffing-box between two metallic washers each having a convex bearing surface and said washer being compacted as a result of the compression applied transversely to the plane of the sheet material.

2. A closure device as defined in claim 1, wherein the compaction of said washer is obtained by compression of approximately 10 bars.

3. A closure device such as a valve or cock which is primarily intended to withstand high temperatures, comprising a movable closure member such as a bored spherical plug in cooperating relation with at least one valve seat applied against a fixed bearing surface of said device, wherein said valve-seat is of graphite and wherein a washer is interposed between the valve-seat and said fixed bearing surface, said washer being resilient carbonaceous sheet material formed by the association of carbon fibers with expanded graphite, said washer being cut out from a sheet and having a structure which is substantially laminated in a direction parallel to the plane of the sheet from which the washer is cut out, said washer having an external diameter which exceeds the diameter of the valve-seat, the projecting portion of said washer being compacted and compressed between the body of said device and said fixed bearing surface.

4. A closure device as defined in claim 3, wherein the compaction of said washer is obtained by compression of approximately 10 bars.

* * * * *